Figure 1:
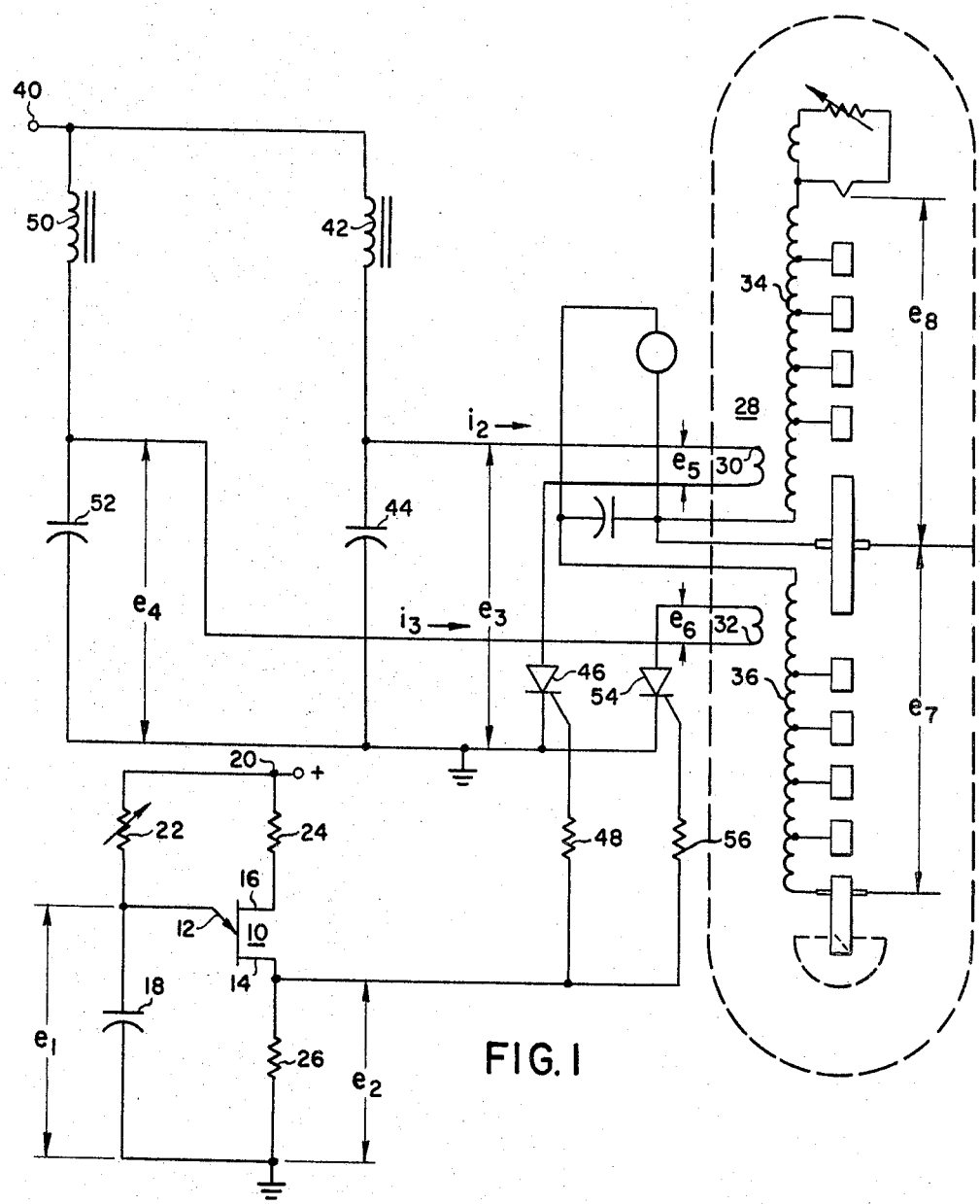

INVENTOR.
HAROLD T. BOEKER
BY Isidore Match
ATTORNEY

United States Patent Office 3,281,643
Patented Oct. 25, 1966

3,281,643
X-RAY RESONANT TRANSFORMER
POWER SUPPLY
Harold T. Boeker, Brookfield, Wis., assignor to General Electric Company, a corporation of New York
Filed July 2, 1962, Ser. No. 206,986
4 Claims. (Cl. 321—45)

This invention relates to power supplies. More particularly, it relates to an improved power supply for X-ray apparatus.

In X-ray equipment, it has been found that when a resonant transformer is utilized, the advantage is presented in that no iron core is needed to carry the magnetic flux through the transformer coils and the space normally taken up by the iron core may be occupied by the X-ray tube. With such arrangement, there is enabled the convenient connecting of the accelerating sections of the X-ray tube into the secondary winding of the transformer at desired voltage levels. The tube, disposed in the center of the transformer coils, consequently is subjected only to an axial voltage stress along its length since the transformer coils function as an electrostatic shield between the X-ray tube and the walls of the tank in which the tube and transformer are contained.

Another advantage resulting from the use of a resonant transformer in X-ray equipment is that it is possible to shape the transformer to approximate a hemisphere within a hemisphere or a cylinder within a cylinder thereby providing an optimum configuration for ultrahigh voltage application.

A further advantage is that the wave shape of the voltage from a resonant transformer is quite good when the transformer is loaded with the direct current component of the X-ray tube. In contrast, an iron core transformer produces a distorted wave shape when it is loaded down with a comparable direct current load. The wave shape generated in the secondary winding of a resonant transformer is not dependent upon the wave shape of the power applied to its primary winding. For example, the power applied to the primary winding may be in the form of pulses on both half cycles or on either of the half cycles, and a sinusoidal voltage wave is still generated in the secondary winding.

Heretofore, the weight and size of the power rectifier and power driver for a resonant transformer have, of necessity, been extremely large. A typical size for the housing for such components may be four and one half feet by two feet by six feet and may weigh as much as one thousand pounds.

It is, accordingly, an important object of this invention to provide a power supply for a center-grounded resonant transformer conveniently utilizable in high voltage X-ray equipment whereby a substantial saving in weight and volume is effected.

It is another object to provide a power supply in accordance with the preceding object which comprises solid state devices thereby effecting substantial economy in maintenance and replacement requirements.

Generally speaking and in accordance with the invention, there is provided in combination with a unidirectional potential source and a center-grounded resonant transformer including first and second primary windings and first and second halves of a secondary winding, a first capacitor and a first gate controlled rectifier in circuit with the first primary winding and the source, a second capacitor and a second gate controlled rectifier in circuit with the second primary winding and the source and an oscillator in circuit with the rectifiers for providing gating pulses thereto to render them concurrently conductive. When the gate controlled rectifiers are rendered conductive, the first and second capacitors discharge through the combinations of the first primary winding and first gate controlled rectifier, and the second primary winding and second gate controlled rectifiers respectively whereby there appears in the halves of the secondary winding voltages 180° displaced in phase with respect to each other.

The novel features, which are believed to be characteristic of this invention, are set forth with particularity in the appended claims. The invention itself, however, both as to its organization and method of operation together with further objects and advantages thereof may best be understood by reference to the following description taken in connection with the accompanying drawings.

Figure 2:
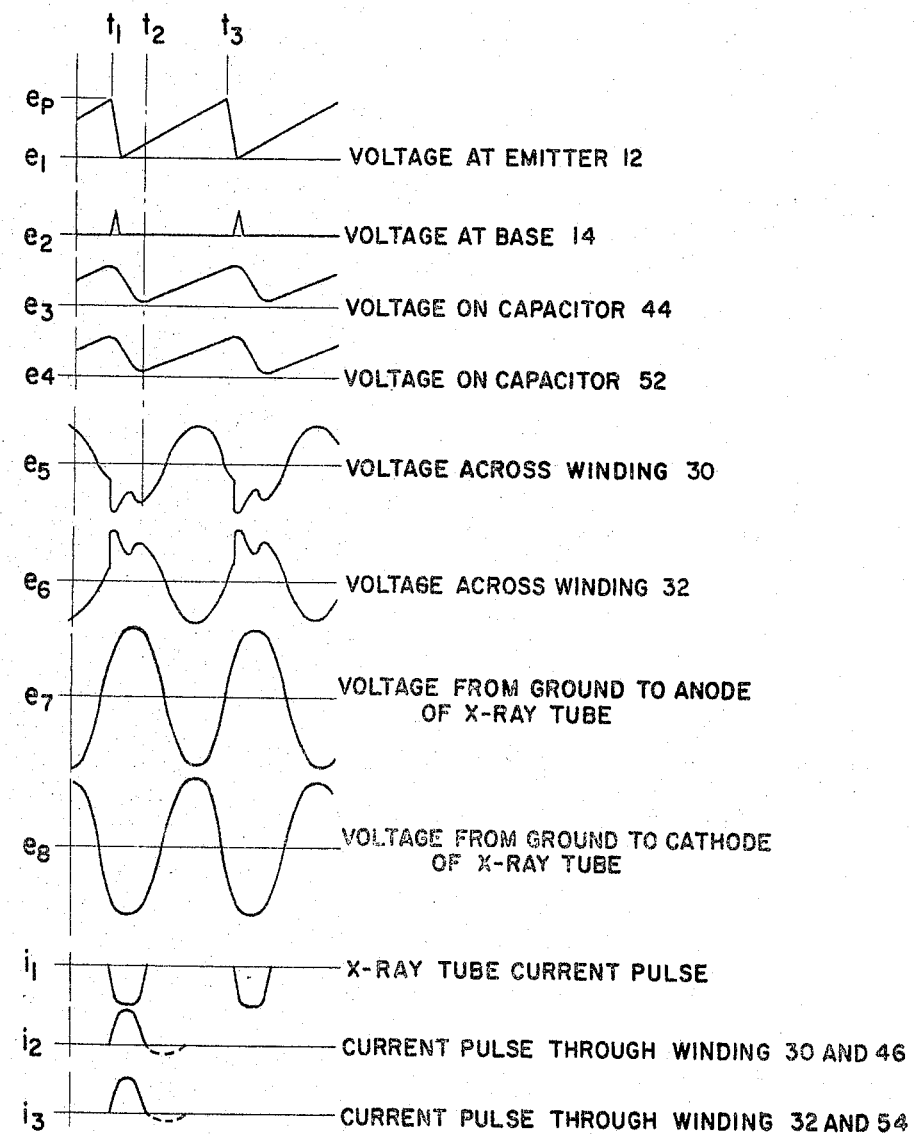

In the drawings, FIG. 1 is a schematic depiction of an illustrative embodiment of the invention; and FIG. 2 is a timing diagram of waveforms occurring at different points in the circuit of FIG. 1.

In FIG. 1, the emitter 12 of a unijunction transistor 10 is connected to ground through a capacitor 18 and to a source of unidirectional potential 20 through a variable resistor 22. One base 16 of transistor 10 is connected to source 20 through a resistor 24 and its other base 14 is connected to ground through a resistor 26.

A first primary winding 30 of a resonant transformer 28 has one terminal connected to a source of unidirectional potential 40 through an inductor 42 and to ground through a capacitor 44 and its other terminal connected to the anode of a silicon controlled rectifier 46, the cathode of silicon controlled rectifier 46 being connected to ground, the gate electrode of silicon controlled rectifier 46 being connected to base 14 through a resistor 48. A terminal of a second primary winding 32 of transformer 28 is connected to source 40 through an inductor 50 and to ground through a capacitor 52, the other terminal of primary winding 32 being connected to the anode of a silicon controlled rectifier 54. The cathode of silicon controlled rectifier 54 is connected to ground and its gate electrode is connected to base 14 through a resistor 56.

In considering the operation of the arrangement of FIG. 1, reference is also made to FIG. 2 which is a timing diagram of the voltage and current waveforms occurring at various points in the circuit of FIG. 1.

In the operation of the circuit of FIG. 1, when voltage is applied from source 40, capacitors 44 and 52 charge toward the potential of source 40 through inductors 42 and 50 respectively. Lines $e_3$ and $e_4$ of FIG. 2 show the voltage waveforms on capacitors 44 and 52. The voltage is concurrently increased at the emitter 12 of unijunction transistor 10 as shown in line $e_1$ of FIG. 2. When the potential at emitter 12 reaches a potential $e_p$, arbitrarily designated as occurring at time $t_1$, unijunction transistor 10 is rendered conductive permitting capacitor 18 to discharge through unijunction transistor 10 and developing a voltage pulse across resistor 26 as shown in line $e_2$ of FIG. 2. This voltage pulse is applied to the gate electrodes of silicon controlled rectifiers 46 and 54 rendering them simultaneously conductive. Consequently, capacitors 44 and 52 discharge through primary windings 30 and 32 and silicon controlled rectifiers 46 and 54 respectively. The respective inductances of primary windings 30 and 32 and capacitors 44 and 52 form respective resonant circuits for the discharge of energy stored in capacitors 44 and 52. Line $e_5$ of FIG. 2 shows the voltage across primary winding 30 and line $e_6$ of FIG. 2 shows the voltage across primary winding 32. The current pulses through primary windings 30 and 32 and silicon controlled rectifiers 46 and 54 follow a damped oscillation curve as shown by line $i_2$ which is the current pulse through primary winding 30 and silicon controlled rectifier 46 and by line $i_3$ which shows the current pulse through primary winding 32 and silicon controlled rectifier 54. When the currents $i_2$ and $i_3$ start to swing negative, the silicon controlled rectifiers are restored to their blocking states before the next occurring voltage pulse $e_2$ is applied to their gate electrodes.

In FIG. 2 it is seen that capacitors 44 and 52 are fully discharged at time $t_2$ as shown by lines $e_3$ and $e_4$ therein. Capacitors 44 and 52 then commence to recharge until time $t_3$ when the next trigger pulses render silicon controlled rectifiers 46 and 54 conductive and thereby again permit the capacitors to discharge through their associated silicon controlled rectifiers and primary windings respectively. The phasing of primary windings 30 and 32 are chosen such that the current pulses in the primary windings occur during the same half cycle that the X-ray tube conducts.

The voltages developed in secondary windings 34 and 36 of transformer 34 are 180° out of phase as shown in line $e_7$ and $e_8$ of FIG. 2. For example, in secondary winding 36, the cathode winding is at a peak negative voltage with respect to ground at the same instant that secondary winding 34 is at the peak positive voltage with respect to ground, making the overall voltage seen by the anode the sum of these peak voltages. The pulse repetition rate of the pulse train produced from unijunction transistor 10 is preferably maintained at a few cycles higher than the resonant frequency of the transformer in order to effect proper commutation to non-conductivity of the silicon controlled rectifiers.

While there has been shown a particular embodiment of this invention, it will, of course, be understood that it is not intended to be limited thereto since many modifications both in the circuit arrangements and in the instrumentalities employed therein may be made and it is therefore contemplated by the appended claims to cover any such modifications as fall within the true spirit and scope of the invention.

What is claimed as new and desired to be secured by Letters Patent of the United States is:

1. In combination with a unidirectional potential source and a center-grounded resonant transformer including first and second primary windings and first and second halves of a secondary winding; a first capacitor and a first gate controlled rectifier in circuit with said first primary winding and said source, a second capacitor and a second gate controlled rectifier in circuit with said second primary winding and said source, means for applying a charge to said first and second capacitors from said unidirection potential source, an oscillator in circuit with said rectifiers for providing gating pulses to said rectifiers to render said rectifiers concurrently conductive, said first and second capacitors thereby discharging through said first primary winding and said first gate controlled rectifier and through said second primary winding and said second gate controlled rectifier respectively, there appearing in said first and second secondary winding halves, voltages 180° displaced in phase with respect to each other.

2. In combination with a unidirectional potential source and a center-grounded resonant transformer including first and second primary windings and first and second halves of a secondary winding; a first capacitor and a first gate controlled rectifier in circuit with said first primary winding and said source, a second capacitor and a second gate controlled rectifier in circuit with said second primary winding and said source, means for applying a charge to said first and second capacitors from said unidirection potential source, an oscillator in circuit with said rectifiers for providing gating pulses to said rectifiers to render said rectifiers concurrently conductive, said first and second capacitors thereby discharging through said first primary winding and said first gate controlled rectifier and through said second primary winding and said second gate controlled rectifier respectively, there appearing in said first and second secondary winding halves, voltages 180° displaced in phase with respect to each other, the frequency of said oscillator being chosen to be slightly greater than the resonant frequency of said transformer.

3. In combination with a unidirectional potential source and a center-grounded resonant transformer for providing power to an X-ray tube, said transformer including first and second primary windings and first and second halves of a secondary winding; a first capacitor and a first gate controlled rectifier in circuit with said first primary winding and said source, a second capacitor and a second gate controlled rectifier in circuit with said second primary winding and said source, means for applying a charge to said first and second capacitors from said unidirection potential source, an oscillator in circuit with said rectifiers for providing gating pulses to said rectifiers to render said rectifiers concurrently conductive, said first and second capacitors thereby discharging through said first primary winding and said first gate controlled rectifier and through said second primary winding and said second gate controlled rectifier respectively, there appearing in said first and second secondary winding halves, voltages 180° displaced in phase with respect to each other, the frequency of said oscillator being chosen to be slightly greater than the resonant frequency of said transformer, the phasing of said primary windings being so arranged whereby said capacitors discharge through said primary windings during a period concurrent with conduction in said X-ray tube.

4. In the combination defined in claim 3 wherein said oscillator comprises a unijunction transistor in circuit with an RC combination and said source, the frequency of said oscillator being determined by said RC combination.

References Cited by the Examiner
UNITED STATES PATENTS

| | | | |
|---|---|---|---|
| 2,823,319 | 2/1958 | Vossberg | 250—98 |
| 3,045,148 | 7/1962 | McNulty et al. | 307—88.5 |
| 3,089,081 | 5/1963 | Brosh | 323—51 |

JOHN F. COUCH, *Primary Examiner.*

LLOYD McCOLLUM, *Examiner.*

J. M. THOMSON, M. L. WACHTELL,
*Assistant Examiners.*